United States Patent Office 2,955,460
Patented Oct. 11, 1960

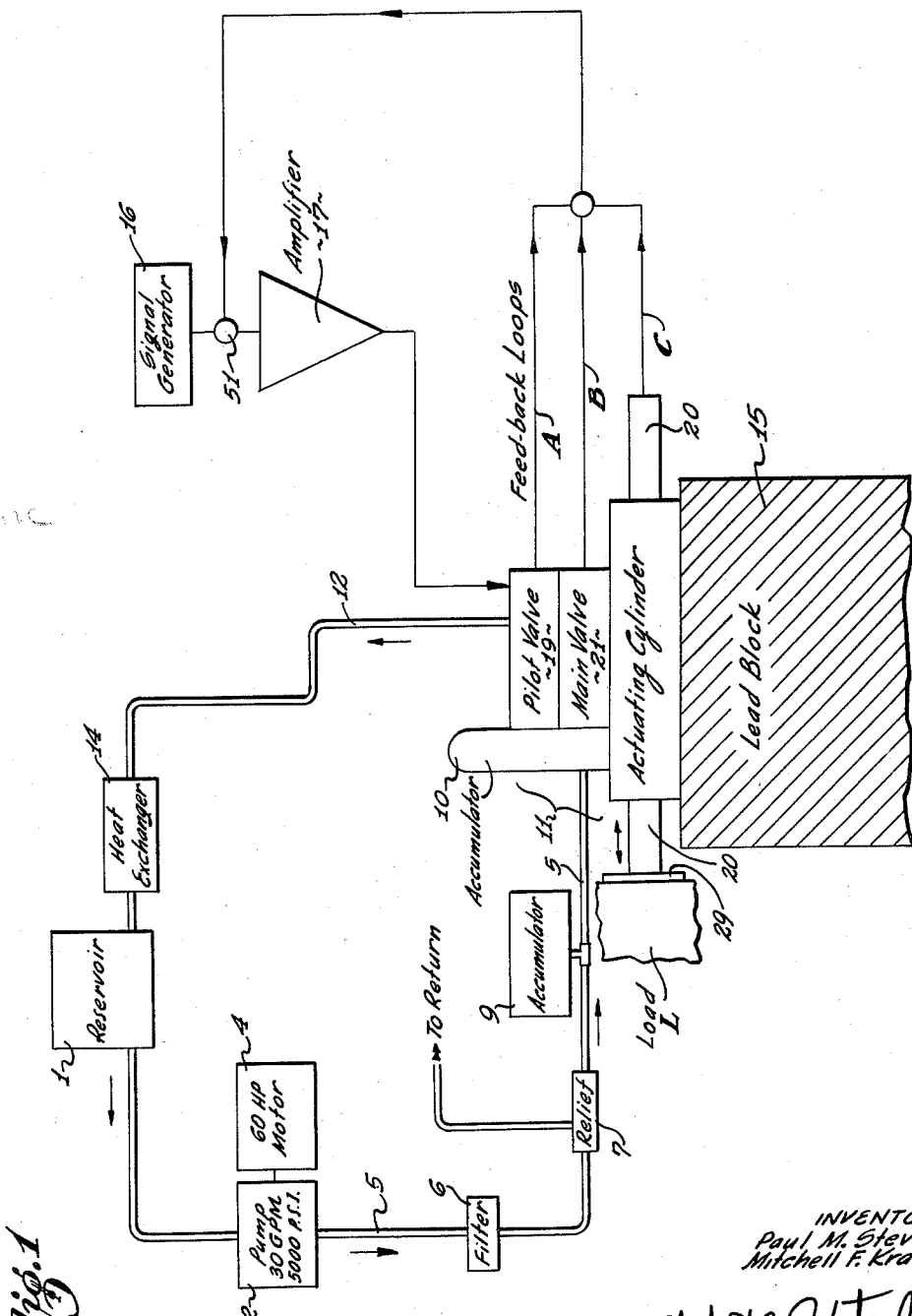

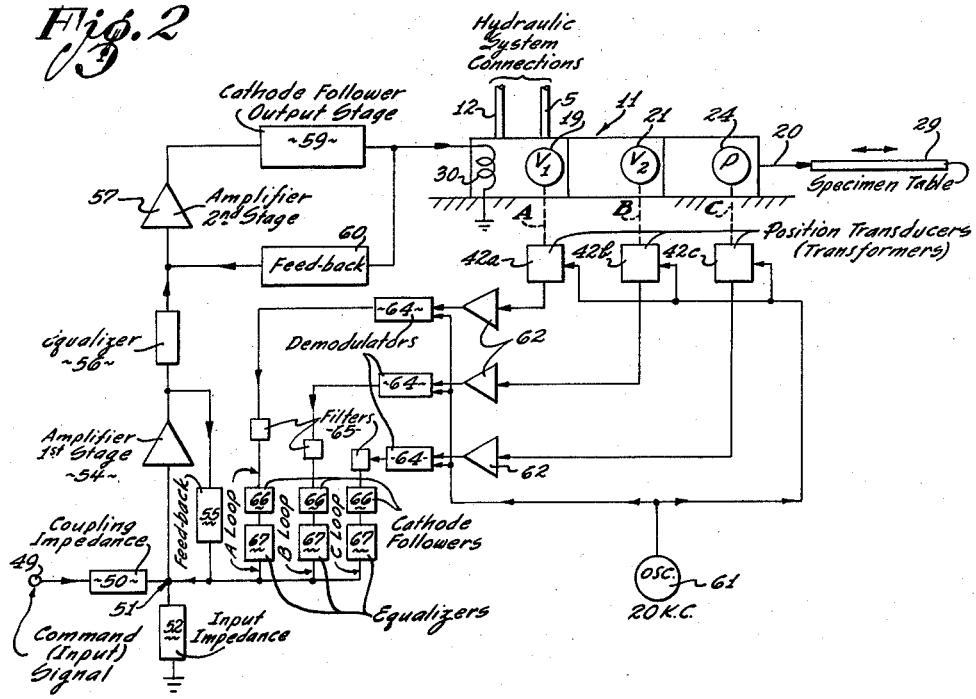
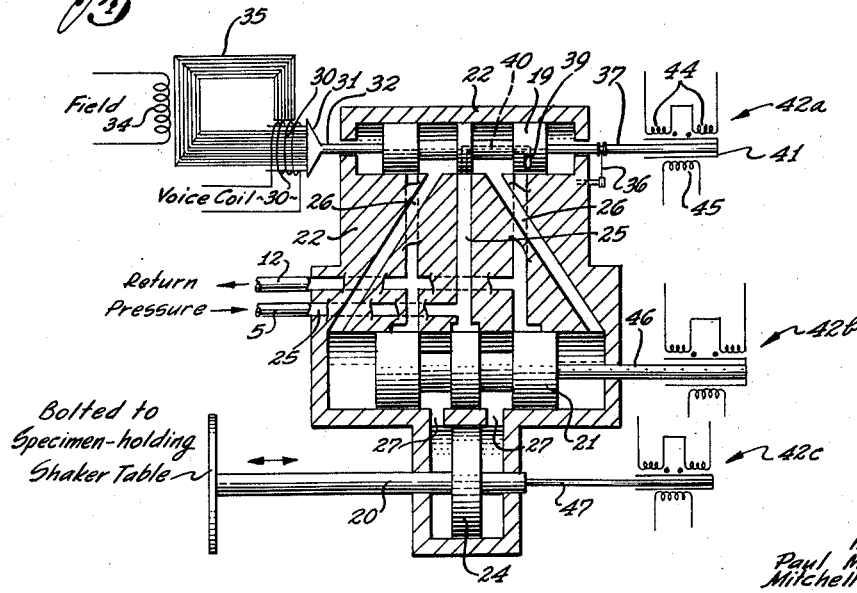

2,955,460

ELECTRO-HYDRAULIC VIBRATION MACHINE

Paul M. Stevens, Redondo Beach, and Mitchell F. Krause, Los Angeles, Calif., assignors to Northrop Corporation, Hawthorne, Calif., a corporation of California Filed Apr. 30, 1957, Ser. No. 656,094

4 Claims. (Cl. 73—71.6)

The present invention relates to vibrators or shakers, and more particularly, to a high-performance, electrically controlled, hydraulically actuated vibration machine capable of vibrating components or assemblies under test to large accelerations (high "G" factors) over a large range of frequencies of from 5 c.p.s. to over 600 c.p.s. for example.

In order to ascertain the effects of vibration and the ability of parts to withstand such vibration as they are expected to encounter in actual use, it has been common practice to provide vibration testing facilities so that these factors may be studied and the final product thus greatly improved in reliability, accuracy, and efficiency.

The presently available vibration testing equipment has been fairly satisfactory for small or light-weight parts when tested at low frequencies and low values of acceleration. However, it is desirable and often required to test complete units and assemblies of complex parts or whole systems, for aircraft for instance, under conditions which cannot be provided by previously existing shaker equipment. It has even been proposed to vibration-test a whole airplane or missile with full equipment and load installed. Obviously, this is impossible to do with conventional vibrators.

Aside from the mere magnitude of the job required in the case of heavy components to be vibrated, another problem occurs which makes one type of presently used shaker unsatisfactory. Much of the equipment to be tested is electrical or electronic instrumentation, so that if using massive electro-magnetic vibration testers, the magnetic fields set up thereby would be detrimental to many such electronic components under test.

Therefore, a general object of this invention is to provide electro-hydraulic vibration testing means capable of exerting forces much greater than those of any other shaker known, these forces being exerted under full control as to direction, frequency, amplitude, and/or acceleration units of the specimen being tested.

It is another object to provide a vibration machine which is externally excited and directly controllable over a large frequency range at an input signal point, i.e., not an oscillator control.

Specific objects of the present invention are to provide a vibrator capable of shaking a specimen load of several hundred pounds at frequencies from about 5 up to at least 600 cycles per second (c.p.s.), and to attain with this weight an acceleration load of at least plus and minus 55 gravitational units (G's).

Briefly, our invention comprises a hydraulic power system, a multiple-stage hydraulic valve and cylinder assembly connected to the hydraulic power lines, the first valve stage being electrically operated and the last cylinder and piston stage adapted to drivingly attach to a load, an electronic amplifier and associated components connected to the input of the first valve stage, and three separate feedback loops from the three stage outputs to a common mixing point at the amplifier input. A control signal input device is also connected to the common mixing point for feeding in the desired magnitude and frequency of an operating signal. A special voice-coil type of drive is preferably used between the amplifier output and the first valve input.

The invention will be more fully understood by reference to the following detailed description of a preferred embodiment and to the accompanying drawings, in which:

Figure 1 is a combined block and line diagram showing the general combination of the present invention.

Figure 2 is a detailed block diagram of the electronic components of the shaker input signal handling system.

Figure 3 is a schematic drawing of the three-stage valve and final actuator of the present shaker, showing input control and feedback transducer connections thereto.

Referring first to Figure 1 for a detailed description of our invention, the hydraulic system will be described first. It comprises a hydraulic reservoir 1, which is preferably pressurized and holds approximately 150 gallons, supplying fluid to a pump 2 driven by a motor 4. Pump 2 may have, for example, a 5,000 p.s.i. 30 g.p.m. capacity, and motor 4 may be at least a 60 H.P. electric motor or equivalent. A pump output pressure line 5 feeds, in turn, a filter 6, relief valve 7, main accumulator 9, and second accumulator 10 immediately adjacent or attached to an actuating assembly 11 containing the working parts of the hydraulic system. From the actuating assembly 11, a return line 12 leads through a heat exchanger 14 back into the reservoir 1. Main accumulator 9 may have a volume of about 10 gallons and second accumulator 10 a volume of about one gallon, for example. The heat exchanger 14 may furnish water cooling to the hydraulic fluid in the return line 12. The actuating assembly 11 must be rigidly anchored on a substantially immovable base, such as a lead block 15 preferably weighing about 15,000 pounds or more, which is itself securely situated and isolated from surrounding structure and/or foundations.

On the other, electronic, side, a signal generator 16 supplies the desired A.C. control signal for the electro-hydraulic shaker and this signal is fed into an amplifier 17. In broad terms, the amplifier output goes to the electrically controlled first stage, or pilot valve 19, of the actuating assembly 11. A final piston rod 20 has the mechanical motion which vibrates the load specimen L in accordance with the control signal from the signal generator 16. As shown, three main feedback channels or loops A, B, and C are taken from the pilot valve 19, a main valve 21, and piston rod 20, respectively, of the hydraulic actuating assembly 11, and mixed together with the command control signal at the input of the amplifier 17.

The actuating assembly 11 is shown further in Figure 3. Here, the hydraulic pressure line 5 and return line 12 enter a body 22 containing the pilot valve 19, main valve 21, and actuator piston 24, respectively operable within their own chambers. The body 22 is schematically shown herein as being a single unit, but actually is made of several pieces as is customary in the art. The three movable stages are all shown in neutral or centered position, where the pressure passages 25 are blocked off at valve inlets.

The pilot valve 19 and the main valve 21 are both the customary type of four-way valve spool with lands spaced to cover or uncover the pressure and return passages in the periphery of the valve chamber to control the movement of the next following valve spool in either direction. Outlet passages 26 from the pilot valve 19 lead to opposite ends of the main valve chamber to move the main valve 21 to the right or left, depending on the direction of movement of the pilot valve 19. Larger outlet passages 27 from the main valve 21 lead a very short distance to opposite sides of the final drive piston 24 for similar control of the latter. The piston rod 20 is driven by the piston 24 and is firmly connected at its outer end to a shaker table represented in Figure 2 by numeral 29, on which is mounted the test object L (Figure 1) to be vibrated.

The pilot valve 19 is driven directly by means of a voice coil 30 wound on an aluminum form which is attached to a light rigid diaphragm 31 in turn connected to the valve by a voice coil rod 32. The voice coil 30 is excited by the amplifier output and is operated within a magnetic field provided by a field coil 34 and iron core 35. The pilot valve 19 is spring loaded to neutral, in the absence of voice coil input, by a centering spring means 36 shown acting between the body 22 and a pilot valve rod 37. In actual practice, the centering spring means is preferably pre-loaded at the neutral position. To aid in reducing friction in the pilot valve 19, a small peripheral jet 39 may be provided from an internal bore 40 connected with the pressure passage 25, to spin the pilot valve 19 and thus prevent it from sticking, especially while left in a static state with full hydraulic pressure applied.

To the end of the pilot valve rod 37 is attached the control core 41 of a first position transducer 42a, which is preferably a Schaevitz transformer having two oppositely wound oscillator input coils 44 connected in series and one output coil 45. The input coils 44 are to be energized by a constant frequency "carrier" voltage. The operation of these position transducers is well known. In neutral, the output coil 45 is not energized, but when the core 41 is moved away from neutral, the output coil has coupled or induced therein an A.C. signal proportional in magnitude to the distance from neutral and indicative, by phase, of the direction from neutral.

The operating outlet passages 26 from the pilot valve 19 lead to the outer ends of the chamber or sleeve of the main valve 21, so that fluid under control of the pilot valve 19 drives the main valve 21. A main valve rod 46 extends externally and has a second position transducer 42b mounted on it, connected in the same manner as the one on the pilot valve rod 37.

Movement of the main valve 21 controls ports from the pressure and return lines 5 and 12 to the larger and shorter outlet passages 27 for driving the final piston 24 and piston rod 20. Thus, a two-stage hydraulic amplifier, with progressively larger diameters and greater power, has been provided to drive the load connected to the piston rod 20. A follow-up rod 47 fixed to the piston rod 20 drives a third position transducer 42c similarly to the first two. Therefore, the third transducer 42c has an output representing the actual shaker output member position or movement. It will be noted that the main valve 21 and the actuator piston 24 are not spring-loaded to center or neutral. Positional control of these two stages is entirely by means of feedback loops.

In Figure 2 is shown the preferred electronic system configuration for feeding the desired electrical signal to the voice coil 30 of the actuating assembly 11. This drawing represents details of the electronic system shown generally in Figure 1. An input signal from signal generator 16 appears at command point 49 and proceeds through a coupling impedance 50 to an input summing point 51. The algebraic sum of the input signal and several other signals yet to be described gives an amplifier input voltage across an input impedance 52, which is applied to a first amplifier stage 54. The command signal from the signal generator is an A.C. signal or has an A.C. component having the frequency and proportional to the magnitude at which it is desired to shake or vibrate the load L. The amplifier stages in this forward loop up to the voice coil 30 are preferably D.C. type amplifiers, to avoid phasing problems. Suitable A.C. amplifiers could be used instead, however.

A first negative feedback circuit 55 is connected around the first amplifier stage 54. The first stage output goes through an amplifier equalizer 56 to the input of a second amplifier stage 57. Output from here is to an output stage 59 which may preferably consist of two or more cathode followers connected in parallel. From the output stage 59, a second negative feedback circuit 60 returns to the input of the second amplifier stage 57. The output stage 59 is directly connected to the voice coil 30 previously mentioned in the actuating assembly 11. The feedback circuits 55 and 60 and the equalizer 56 are for the purpose of providing a strictly linear amplifier response throughout the desired frequency range (5 c.p.s. to over 600 c.p.s. in this instance) before attempting to evaluate or adjust the response of the pilot valve 19.

The position transducers 42a, 42b, and 42c from the pilot valve 19, main valve 21, and actuator piston 24, respectively, are the originating elements for feedback signals to be transmitted and handled as required in the three separate feedback loops A, B, and C. An oscillator 61 operating at 20 kc. per second energizes each transducer and this frequency is modulated as previously mentioned for the separate transducer outputs.

Each feedback loop contains an A.C. amplifier 62 (which may include more than one stage) and a demodulator 64. The demodulators 64 also have the 20 kc. reference voltage from the oscillator 61 supplied thereto, and the demodulator outputs thus contain the original modulating signal only. The demodulated signals in each feedback loop then pass through a 20 kc. filter 65 to remove any remaining carrier voltage and then to a cathode follower 66 which acts as an isolation amplifier between the filter 65 and the following component in each loop.

Finally, each feedback loop has a separate feedback equalizer 67 connected to the cathode follower output. Then the outputs from all feedback equalizers 67 are connected together at the input summing point 51. The feedback equalizers 67 contain the necessary signal mixing components for the desired relative ratio of the feedback signal amplitudes, and whatever signal shaping or frequency discriminating elements are required due to characteristics of the actuating assembly 11.

In operation of the system, the signal generator 16, which represents any suitable means for providing the desired electrical signal to be translated accurately into motion of the load L, continuously feeds the desired signal voltage waveform into the shaker at input summing point 51. From this point, assuming no feedback signals are present for the moment, the input signal passes through the first and second amplifier stages 54 and 57 and output stage 59, which have amplified the signal and put it in proper form for energizing the voice coil 30. Here, the electrodynamic structure of voice coil and field coil 34 moves the pilot valve 19 back and forth in response to the signal. The pilot valve 19, by normal hydraulic valve action, gives main valve 21 a resultant motion, and at the same time an electrical signal representing the instantaneous pilot valve position is generated by Schaevitz transformer 42a. This follow-up signal is handled in feedback loop A and a portion of it appears at the original summing point 51 substantially 180 degrees out of phase with the command input signal from signal generator 16. This is, therefore, similar in action to that of negative feedback in purely electronic amplifiers, and results in making pilot valve motion conform exactly to the command input signal, if no additional feedback signals from the other loops are assumed.

The main valve 21, driven by the pilot valve 19 as previously described, provides the porting action to control fluid to the final output piston 24 and drive it. Here again, the position of the main valve 21 produces, by means of Schaevitz transformer 42b, a signal exactly corresponding to main valve position, and this second follow-up signal forms the initial shape of the feedback signal handled in feedback loop B.

Similarly, the exact motion of piston 24 (and thus load L) is transduced by Schaevitz transformer 42c and the third feedback loop C carries and adjusts the final feedback signal to summing point 51. The waveform actually presented to the first amplifier stage 54 is therefore the algebraic sum of the command signal from generator 16, for example, and the feedback signals from the three equalizers 67 in the loops A, B, and C.

In arriving at the specific configuration of the equalizer networks, feedback fractions, gain factors and the like in the feedback loops A, B, and C (e.g., actual component values), the apparatus is operated first with only the feedback loop A for the pilot valve 19 being closed, so that the pilot valve response can be analyzed and corrected as required in the feedback loop A. Then the main valve 21 operation is added and observed with the feedback loop B closed also, and the necessary compensations made in this loop, and so on. The whole procedure treats the device as a servomechanisms problem and the various techniques known in that field are employed and applied to the electronic circuits.

Hence, the total resultant signal actually fed to voice coil 30 is forced to be the correct one which will result in the shaker output motion conforming to the input command signal.

By connecting the feedback loops as taught in this invention, the whole resulting operation can be controlled to a fine degree. The three loops A, B, and C are each connected in negative feedback relation, which was considered necessary for proper positional control. Assuming a sine wave input voltage from the signal generator 16 with a maximum distortion of 1%, the shaker output head (piston rod and table) has a sine wave output with a maximum second order distortion of only 10%. This compares favorably with the second and third order (velocity and acceleration) distortion present in the closest type of presently available so-called "high performance" vibration equipment. It is also very important to note that the present invention is capable of handling complex waveform inputs with equal performance. Many tests are desired to be made with a complex input signal having all frequencies, within the range of 5 to 1000 c.p.s., present at once. By following the teachings disclosed herein, the shaker is universally applicable, and will faithfully reproduce any input waveform, including a random noise signal.

The shaker table 29 which is used to mount the test article for vibration in a horizontal direction is preferably restrained to a fixed position in the vertical direction but is of course made free to be moved a short distance in the direction of vibration. For testing of the load specimen L in other directions, it may be mounted in other positions on the table 29, or the entire actuating assembly 11 and table 29 may be built to be rotated and swung through 90 degrees relative to the reaction block 15, to vibrate the load in a vertical plane.

The capabilities of the present device have been found to be more than adequate for vibration-testing a 1,700 pound load between 5 and 600 c.p.s., using a 3,000 p.s.i. hydraulic system. Accelerations of ±10 G's have been met throughout a wide frequency range with the latter load. There are no doubts that a frequency of more than 1,000 c.p.s. or 1,500 c.p.s. under load is easily attainable with more refinement of the particular embodiment now in use. It has demonstrated an output of 70 G's at 600 c.p.s. with a load of about 200 pounds. This performance is far above that obtainable with any known available shaker equipment. With a 5.3 square inch piston and using 3,000 p.s.i. hydraulic fluid pressure, the peak available dynamic force is about 16,500 pounds. If a 5,000 p.s.i. system were used, the peak available dynamic force would be over 26,000 pounds.

Another reason may be pointed out for the exceptionally good results achieved with our invention. Large electromagnetic shakers have a very high mass of the output member even before a load is attached. This machine mass amounts to about 200 pounds in some cases, whereas the output members of the present device weigh only about 10 or 15 pounds.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An electro-hydraulic shaker comprising a hydraulic power supply with pressure and return lines, a two-stage hydraulic amplifier connected to said pressure and return lines and having an actuating cylinder with a piston output member, electrically operated driving means connected to said hydraulic amplifier, and multiple-loop electrical signal handling means compensated by hydraulic amplifier response and connected to the input of said driving means, said output member adapted to be drivingly attached to a load to be vibrated, said hydraulic amplifier comprising an electrically operated pilot valve, with electrical input connections thereto, a pilot valve-controlled main valve, and a main valve-controlled piston, said signal handling means comprising a common input terminal adapted to be connected with an A.C. control signal source, equalized linear amplifier means connected to said input terminal, first, second, and third electrical position transducers connected respectively to said pilot valve, main valve, and piston, said transducers being of the modulated carrier type, a constant frequency oscillator means connected to all of said transducers, amplifier and demodulator means connected to the output of each said transducer, and separate coupling means connected between the output of each demodulator means and said common input terminal to form three separate feedback loops from said pilot valve, said main valve and said piston, respectively, to said common input terminal.

2. Electro-hydraulic vibration means comprising a signal generator; wide-band amplifier means connected to the output of said signal generator; an electrically controlled hydraulic valve and actuator assembly connected to the output of said amplifier means; a high-pressure hydraulic power supply system with pressure and return lines connected to said valve and actuator assembly; said assembly comprising an electrically motivated pilot valve, a main valve controlled by said pilot valve, an output piston controlled by said main valve, and a load-mounting fixture connected to said piston; three separate negative feedback loops originating and connected respectively to the outputs of said pilot valve, said main valve, and said piston; said feedback loops feeding into equalizing, gain control, and mixing networks; the outputs of said mixing networks connected to a common summing point at the junction between the output of said signal generator and the input of said amplifier means; whereby a sine wave output from said signal generator results in a strictly proportional sine wave output motion of said fixture over a wide frequency range and with a very high ascillatory vibrating force.

3. An electro-hydraulic shaker comprising a hydraulic power supply having a predetermined constant output pressure and provided with pressure and return lines; a two-stage hydraulic amplifier connected to said pressure and return lines and including an electrically operated pilot valve spool of small size and mass, first means communicating said pressure and return lines directly to said pilot valve spool, land means on said pilot valve spool positioned to close said first communicating means when said pilot valve spool is in a central null position, a pilot valve-controlled main valve spool of larger size and mass, second means communicating said pressure and return lines directly to said main valve spool, land means on said main valve spool positioned to close said second communicating means when said main valve spool is in a central null position, means including operating outlet passages from said pilot valve leading to opposite operating sides of said main valve so that the net unbalanced pressure on said main valve is controlled and determined solely by pilot valve position, a main valve-controlled actuating cylinder and piston assembly of still larger size, means including large low-loss operating outlet passages from said main valve leading to opposite operating sides of the piston so that the net unbalanced pressure on said piston is controlled and determined solely by main valve position, and an externally extending piston rod attached to said piston and forming the output member of said shaker, said pilot valve being spring-loaded to neutral center, the actuating forces on said main valve and said piston consisting solely of the fluid metering action in the pressure and return fluid by said pilot valve and said main valve, respectively; electrical driving means connected to said pilot valve spool; a command input connection to said electrical driving means; a first feedback loop connected from said pilot valve spool to said input connection; a second feedback loop connected from said main valve spool to said input connection; and a third feedback loop connected from said piston rod to said input connection, said feedback loops including structure responsive to the mechanical motion of said valve spools and said piston; said output member adapted to be drivingly attached to a load to be vibrated.

4. Apparatus in accordance with claim 3 wherein said electrical driving means comprises a high stability D.C. amplifier means having a linear output response between about 5 to over 600 cycles per second, and wherein said three feedback loops are negative feedback channels.

References Cited in the file of this patent

UNITED STATES PATENTS

| | | |
|---|---|---|
| 2,709,421 | Avery | May 31, 1955 |
| 2,767,689 | Moog | Oct. 23, 1956 |
| 2,771,062 | Hayner | Nov. 20, 1956 |
| 2,773,482 | Dickie | Dec. 11, 1956 |
| 2,823,689 | Healy | Feb. 18, 1958 |
| 2,880,708 | Hayner | Apr. 7, 1959 |
| 2,886,009 | Myers | May 12, 1959 |

OTHER REFERENCES

Honnell: "Electronic Shake Table," Electronics magazine, June 1954, pp. 178–179.